(12) United States Patent
Detwiler et al.

(10) Patent No.: US 9,350,447 B1
(45) Date of Patent: May 24, 2016

(54) SYSTEMS AND METHODS FOR PROTECTING OPTICAL NETWORKS FROM ROGUE OPTICAL NETWORK TERMINALS

(75) Inventors: Thomas Detwiler, Huntsville, AL (US); Leif J. Sandstrom, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 13/530,841

(22) Filed: Jun. 22, 2012

(51) Int. Cl.
*H04B 10/077* (2013.01)
*H04B 10/272* (2013.01)
*H04Q 11/00* (2006.01)
*H04J 14/02* (2006.01)

(52) U.S. Cl.
CPC .......... *H04B 10/077* (2013.01); *H04J 14/0282* (2013.01)

(58) Field of Classification Search
None
See application file for complete search history.

(56) References Cited

U.S. PATENT DOCUMENTS

| | | | |
|---|---|---|---|
| 8,606,117 B1 | 12/2013 | Turner et al. | |
| 2004/0264843 A1* | 12/2004 | Leonczuk et al. | 385/16 |
| 2006/0093356 A1 | 5/2006 | Vereen et al. | |
| 2009/0238564 A1* | 9/2009 | Rohde et al. | 398/45 |
| 2010/0067376 A1* | 3/2010 | Lee et al. | 370/230 |
| 2010/0074614 A1 | 3/2010 | DeLew et al. | |
| 2010/0183296 A1* | 7/2010 | De Langen et al. | 398/16 |
| 2010/0183298 A1 | 7/2010 | Biegert et al. | |
| 2010/0189445 A1* | 7/2010 | Nakashima | H04B 10/60 398/152 |
| 2011/0069955 A1* | 3/2011 | Hajduczenia et al. | 398/45 |
| 2011/0116798 A1* | 5/2011 | Kai | 398/58 |
| 2011/0129214 A1* | 6/2011 | Zheng | 398/27 |
| 2011/0255860 A1* | 10/2011 | Lee et al. | 398/12 |

FOREIGN PATENT DOCUMENTS

| | | |
|---|---|---|
| EP | 1884758 | 8/2006 |
| EP | 1901448 | 9/2006 |

* cited by examiner

*Primary Examiner* — Shi K Li
*Assistant Examiner* — Mina Shalaby
(74) *Attorney, Agent, or Firm* — Maynard Cooper & Gale, P.C.; Jon Holland

(57) ABSTRACT

A communication system comprises a passive optical network (PON) having an optical line terminal (OLT) coupled to a plurality of optical network terminals (ONTs) through a power splitter. Each ONT is coupled to the power splitter via a subscriber line. A switch is coupled to each subscriber line, and all of the switches are coupled to a control element. A power element is configured to receive optical signals communicated by the PON and to convert the optical signals into electrical power for use by the control element. The OLT is configured to detect a rogue ONT and to communicate with the control element for opening the switch that is coupled to the subscriber line of the rogue ONT, thereby optically isolating the rogue ONT from the rest of the PON.

25 Claims, 4 Drawing Sheets

SYSTEMS AND METHODS FOR PROTECTING OPTICAL NETWORKS FROM ROGUE OPTICAL NETWORK TERMINALS

RELATED ART

A time division multiplexed passive optical network (TDM PON) typically has a point-to-multipoint architecture in which an optical line terminal (OLT) is coupled to a plurality of optical network terminals (ONTs). In the upstream direction, communication is time division multiplexed, and the OLT assigns each ONT timeslots in which the ONT is permitted to transmit across the PON to the OLT. However, in some cases, an ONT may not respond properly to the commands from the OLT due to errors or faults at the ONT or otherwise. As an example, the ONT may transmit in timeslots that have been allocated for other ONTs, thereby interfering with the transmission from the other ONTs. Such an ONT that transmits outside of its allocated timeslots is often referred to as a "rogue" or "babbling" ONT.

A rogue ONT can disrupt the PON by interfering with transmissions by other ONTs. In many cases, rogue ONTs do not respond to commands from the OLT, and even if the OLT can identify the source of rogue behavior, the OLT is unable to prevent the babbling ONT from interfering with network communication. Some ONTs have a watchdog circuit that monitors the communications of an ONT and disables the ONT when rogue behavior is detected. However, such watchdog circuits are not always reliable, and sometimes the same problem causing rogue behavior in an ONT may prevent its watchdog circuit from effectively disabling it.

In at least one proposed solution, such as is disclosed by U.S. Pub. No. 2009/0238564, a switch is inserted into the path of a subscriber line extending from an ONT to a network device, such as a power splitter, between the ONT and OLT of a PON. A control circuit at the location of the switch monitors the signals communicated across the subscriber line, and if rogue behavior is detected, the circuit actuates the switch such that communication between the ONT and the rest of the PON is disabled. Thus, a babbling ONT can be effectively isolated from the OLT and other ONTs without relying on a watchdog circuit at the ONT.

However, the switch might reside at a location that does not have a readily available power source, and ensuring that there is sufficient power to operate the control circuit and actuate the switch may be problematic. Batteries may be used to provide the requisite power, but they eventually must be replaced thereby imposing an undesirable maintenance burden on the network service provider. Further, the circuit and switch may be located at a remote or inconvenient location for battery replacement.

U.S. Patent Pub. No. 2009/0238564 proposes drawing power from the optical signals communicated across the communication line of an ONT, and using such power for the control circuit and switch that are used for isolating the ONT. However, such powering technique reduces the power of the optical signal, thereby degrading signal quality. Thus, there exists a trade-off between drawing more power from the optical signals of the communication line for the purpose of ensuring proper operation of the control circuit and switch and minimizing the amount of power drawn from such optical signals in order to enhance signal quality.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for protecting optical networks from rogue optical network terminals (ONTs). In one exemplary embodiment, a communication system comprises a passive optical network (PON) having an optical line terminal (OLT) coupled to a plurality of ONTs through a power splitter. Each ONT is coupled to the power splitter via a respective subscriber line. A switch is coupled to each subscriber line, and a plurality of the switches are coupled to a control element for controlling the states of the switches. In this regard, the OLT is configured to detect a rogue ONT on the PON and to communicate with the control element in order to cause such control element to open the switch that is coupled to the subscriber line of the rogue ONT, thereby effectively isolating the rogue ONT from the rest of the PON. Thus, the rogue ONT is prevented from interfering with the transmissions by the other ONTs across the PON.

Further, a power element is also coupled to each subscriber line and draws a small amount of power from the optical signals carried by the subscriber lines. The power element combines power from multiple subscriber lines into a power signal that is used for powering the control element and the switches. Accordingly, multiple subscriber lines share the burden of powering the control element and switches. Further, using a central control element to control the switches of multiple lines helps to reduce the overall power requirements for monitoring multiple lines for rogue behavior. By reducing the overall power requirements of the control circuitry and sharing the power burdens across multiple lines, the amount of power drawn from each respective subscriber line can be reduced relative to an embodiment in which each subscriber line separately provides power for controlling its respective switch.

Figure 1:
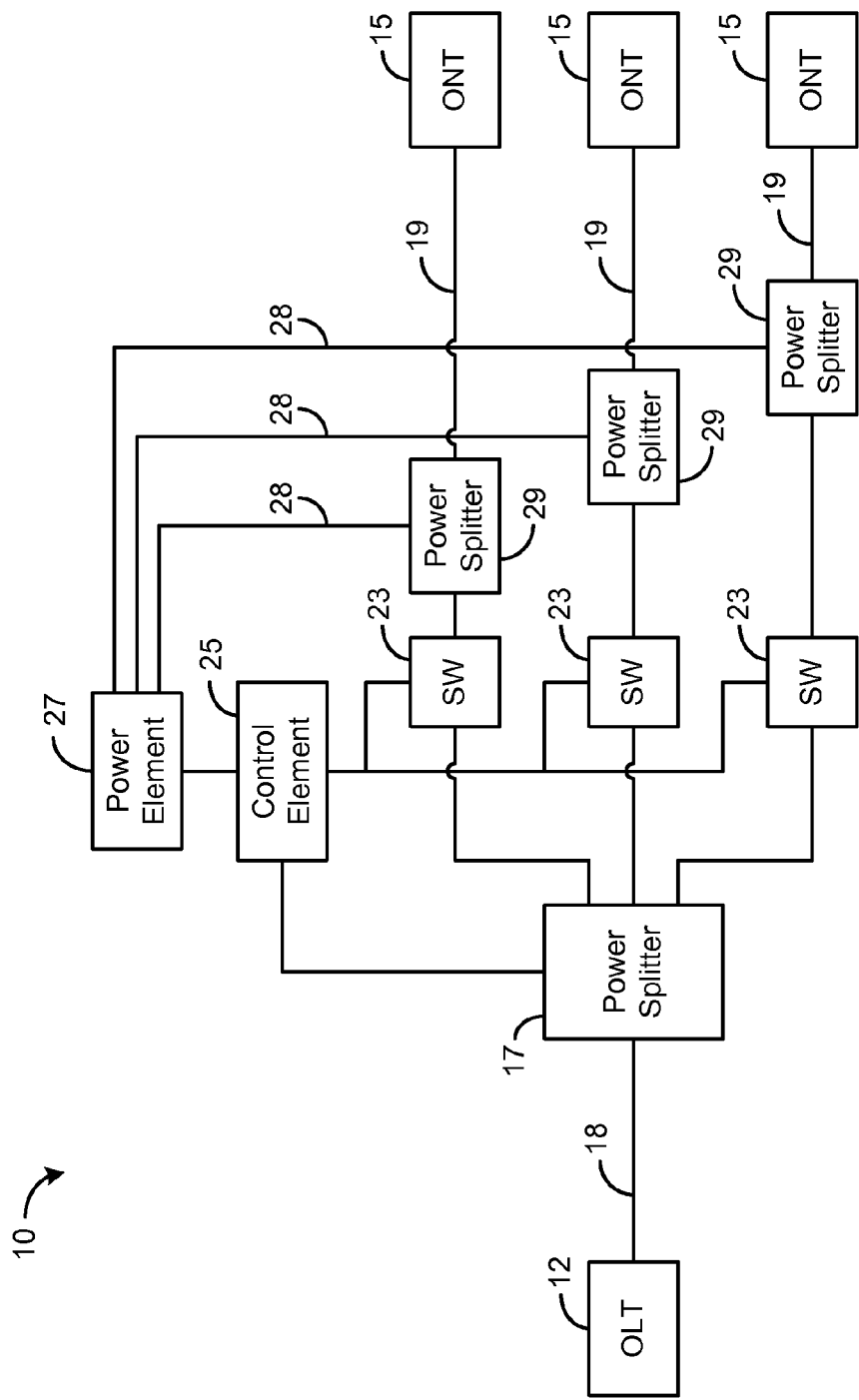
FIG. 1 is a block diagram illustrating an exemplary passive optical network in accordance with the present disclosure.

FIG. 1 depicts an exemplary embodiment of a PON 10. In the exemplary embodiment shown by FIG. 1, the PON 10 comprises an OLT 12 coupled to a plurality of ONTs 15 via a power splitter 17. The OLT 12 is coupled to the power splitter 17 via a communication line 18 (referred to hereafter as "OLT line") comprising an optical fiber, and each ONT 15 is coupled to the power splitter 17 via a respective communication line 19 (referred to hereafter as "ONT line") comprising an optical fiber. The power splitter 17 is configured to split the power from an optical signal transmitted across the OLT line 18 for transmission across the ONT lines 19. The power splitter 17 also sends a small amount of the power from the optical signal to a control element 25 for providing a control channel to the control element 25, as will be described in more detail hereafter. Note that the power splitter 17 is passive. In other embodiments, it is possible for the components of the network to be active.

In the downstream direction, each ONT 15 receives an optical signal and converts the optical signal into an electrical signal for further processing. In one embodiment, each ONT 15 resides at and serves a single respective customer premises. In other embodiments, any of the ONTs 15 may serve multiple customer premises. As an example, an ONT 15 may reside at a distribution point and be coupled to customer premises equipment (CPE) at a plurality of customer premises. In the upstream direction, each ONT 15 receives an electrical signal and converts the electrical signal into an optical signal for transmission across the PON 10 to the OLT 12.

The OLT 12 is configured to control communication across the PON 10 by communicating with the ONTs 15 via a control channel across the PON 10. In this regard, communication from the ONTs 15 to the OLT 12 (e.g., the "upstream" direction) is time division multiplexed. The OLT 12 communicates with each ONT 15 and allocates timeslots to each ONT 15 during which the ONT 15 is permitted to transmit across the PON 10 to the OLT 12 so that upstream data collisions on the PON 10 are avoided. Each ONT 15 comprises a laser (not shown) and is configured to transmit optical signals across the PON 10 via its respective ONT line 19, and the power splitter 17 allows such signals to pass to the OLT 12. An ONT 15 that transmits signals across the PON 10 during a timeslot that has not been allocated to it is referred to herein as a "rogue ONT 15." The OLT 12 is further configured to detect rogue ONTs 15 and to control the operation of a control element 25 in order to optically isolate rogue ONTs 15 from the rest of the PON 10 (e.g., the OLT 12 and the other ONTs 15), as will be discussed in more detail hereafter.

The PON 10 further comprises a plurality of switches 23 wherein each switch 23 is coupled to a respective one of the ONT lines 19 and operates under the control of the control element 25. In one embodiment, each switch 23 comprises a latching switch such that the switch draws electrical current only when transitioning states, but other types of switches 23 are possible in other embodiments. When a switch 23 is in a closed position, the switch 23 allows optical signals on the ONT line 19 to pass. Thus, the line 19 and ONT 15 connected to the switch 23 are optically connected to the PON 10 and, specifically, to the power splitter 17 and the OLT 12. However, when the switch 23 is in an open position, the switch 23 prevents optical signals on the ONT line 19 from passing. That is, the ONT line 19 and ONT 15 connected to the switch 23 are optically isolated from the rest of the PON 10 and, more specifically, from the OLT 12 and power splitter 17. Thus, such ONT 15 is unable to communicate with the OLT 12 and interfere with the transmissions of the other ONTs 15. Accordingly, a rogue ONT 15 is prevented from communicating across the PON 10 by placing its corresponding switch 23 into an open state so that it is optically isolated from the other components of the PON 10, such as the OLT 12 and the other ONTs 15.

Note that there are various techniques that can be used to detect rogue behavior from an ONT 15. As an example, the control element 25 could monitor the data and control information that is communicated between the OLT 12 and the ONTs 15 and determine when each ONT 15 is permitted to transmit to the OLT 12. If the control element 25 detects a transmission from any ONT 15 during timeslots that are not allocated to such ONT 15, then the control element 25 may classify the ONT 15 as rogue and transition its corresponding switch 23 to an open state so that the rogue ONT 15 is prevented from communicating across the PON 10. However, in such an approach, the control element 25 is constantly monitoring high-speed data signals likely causing the control element 25 to consume significant power.

In an alternative embodiment, the OLT 12 detects and identifies a rogue ONT 15 and communicates via a low-speed control channel with the control element 25 to inform such element 25 which ONT 15 is rogue and/or which switch 23 should be transitioned to an open state. There are various techniques that the OLT 12 can use to identify rogue ONTs 15 and/or control the states of the switches 23. As an example, when the OLT 12 detects or suspects rogue behavior (e.g., interference in the upstream channel), the OLT 12 can instruct the control element 25 to serially transition the switches 23 that are in the closed state one at a time to the open state. If the interference disappears immediately after the transition of a switch 23 to the open state, then it can be assumed that such switch 23 is coupled to the rogue ONT 15. In such case, the switch 23 that is coupled to the rogue ONT 15 may be left in the open state while the switches 23 coupled to the other ONTs 15 might be placed back into the closed state. In other embodiments, other techniques for identifying rogue ONTs 15 and/or controlling the switches 23 are possible.

Thus, as described above, the control element 25 is configured to control the states of the switches 23 based on control information received from the OLT 12. Note that the control information could be communicated via a control channel that is embedded in the protocol of the optical signals communicated across the PON 10. As an example, the standards for Gigabit PON (GPON) define control frames into which the OLT 12 may insert control information for controlling the operation of the PON 10, thereby providing a control channel that the OLT 12 can use for communicating with the control element 25. However, using such an embedded control channel requires the control element 25 to read a high speed data stream in order to receive a relatively small amount of control information. Such an approach would likely result in the control element 25 consuming a significant amount of power. Such consumption may not be a problem if there is a readily available power source nearby, but the control element 25 may be located in an environment in which there is not such a power source. Thus, minimizing the power consumption of the control element 25 may be desirable so that the use of batteries can be avoided and/or the control element's reliance on such batteries can be reduced.

In one embodiment, the OLT 12 communicates with the control element 25 via a low-speed control channel that is separate from the control channels embedded in the optical protocol of the PON 10. Accordingly, the control element 25 consumes less power since it can effectively ignore the data of the PON's high-speed data stream while receiving control information from this low-speed control channel.

In one exemplary embodiment, the low-speed control channel for communicating between the OLT 12 and the control element 25 is established by modulating the high-speed data stream that is transmitted by the OLT 12 to the ONTs 15 in accordance with the optical protocol of the PON 10. Various types of modulation, such as amplitude modulation, frequency modulation, and/or phase modulation, may be used to establish the control channel. Exemplary techniques for embedding a low-speed control channel in a high-speed optical data signal via amplitude modulation are described in commonly-assigned U.S. patent application Ser. No. 12/783,999, entitled "Systems and Methods for Unobtrusively Testing Optical Fibers" and filed on May 20, 2010, which is incorporated herein by reference. In the foregoing patent application, a control channel is formed for transmitting an optical-time domain reflectometer (OTDR) signal across an optical fiber. In this disclosure, the control channel is instead used to convey control information from the OLT 12 to the control element 25. In this regard, to form the control channel, the high-speed data stream to be transmitted by the OLT 12 across the PON 10 is modulated with digital data defining the control information to be transmitted from the OLT 12 to the control element 25. After such modulation, the data stream is converted from the electrical domain to the optical domain for transmission across PON 10.

For amplitude modulation, the modulation of the data signal is preferably kept small (e.g., less than about 10% of the peak power of the data signal) so that it should not cause errors in the recovery of the data signal by the ONTs 15. That is, the modulation appears as low-level noise to the ONTs 15. However, the slight power fluctuations caused by the modulation can be detected by the control element 25 so that it can recover the control information from the optical signal propagated across the PON 10. Such control information can be communicated at a much slower rate than that of the data signal allowing the control element 25 to operate with lower power requirements relative to an embodiment in which the control channel is communicated at a higher rate, such as when it is embedded in the optical protocol of the PON 10.

As shown by FIG. 1, the PON 10 further comprises a power element 27 coupled to the control element 25 for supplying power to the control element 25. In one embodiment, the power element 27 is further coupled to each ONT line 19 via a respective connection 28 comprising an optical fiber and a respective power in-line splitter 29. The connections 28 shall be referred to hereafter as "power connections." The power element 27 is configured to draw a small amount of power (e.g., less than about 10% of the total signal power) from the signals transmitted by each ONT 15. In this regard, each power splitter 29 is configured to direct a small amount of each optical signal from its corresponding ONT 15 to the power element 27. The power element 27 converts the received optical signals into electrical current for sourcing a power signal that is used to power the control element 25 and switches 23, as will be described in more detail below. The remainders of the optical signals from the corresponding ONT 15 are allowed to pass such they propagate toward the switch 23.

Due to the relatively low power requirements of the control element 25, as described herein, the power element 27 should be able to meet the power requirements of the control element 25 and the switches 23 via the power that is drawn from optical signals transmitted across the PON 10 by the ONTs 15. In one embodiment, the power element 27 comprises a capacitive element (not shown in FIG. 1) and one or more photovoltaic elements (not shown in FIG. 1), discussed in more detail hereafter. The power element 27 converts a small percentage of the optical signal from each ONT 15 and/or the OLT 12 into electrical current that is used for operating the control element 25 and the switches 23. In one embodiment, approximately an equal amount of power is derived from each ONT line 19 and is combined into a conditioned power signal that is provided to the control element 25 for controlling the switches 23. Accordingly, the ONTs 15 equally share the burden of powering the control element 23 and switches 23. In other embodiments, other configurations are possible.

If the power requirements of the control element 25 and switches 23 can be kept low, then it is possible for the power derived from the ONT lines 19 to be sufficient without requiring power from an external source, such as a battery. During periods when the control element and switches 23 are consuming relatively small amounts of power, energy derived from the ONT lines 19 can be stored in a capacitive device (not shown in FIG. 1). Later when power demands are increased, such as when a switch 23 is actuated, stored energy may be used for satisfying the power demands.

Without storing energy over time, having sufficient power derived solely from the ONT lines 19 for actuating a switch 23 may be problematic given that only a small amount of power can likely be drawn from the optical signals of a given ONT line 19 without significantly affecting the quality of such signals. In one embodiment, the control element 25 controls the switches 23 via an algorithm that prevents multiple switches 23 from being activated at the same time. That is, the control element 25 activates the switches 23 one at a time, and the control element 25 may be configured to wait a predefined amount of time after actuating one switch 23 before actuating another so that the power element 27 has a chance to replenish its stored power between switch actuations. Further, the switches 23 may be designed for low power operation. As an example, latching switches may be used such that power needs to be provided to a switch 23 only when the switch 23 is to change state. Once a switch 23 is transitioned to a new state, the switch 23 remains in such state without consuming power. Later, power may be applied to the switch 23 to again switch states, but between states, the switch 23 does not consume power.

By employing some of the foregoing techniques, the power requirements of the control element 25 and switches 23 during any given time period can be kept relatively low, while the control element 25 is continuously drawing and, when possible depending on the power requirements of the control element 25 and switches 23, storing energy from multiple ONT lines 19. Under such circumstances, the chances of continuously meeting the power requirements of the control element 25 and the switches 23 with power from the ONT lines 19 increases. Even though it is possible to power the control element 25 and switches 23 with power from the ONT lines 19, it may be desirable to maintain a separate power source (not shown in FIG. 1), such as a battery to ensure that there is sufficient power available for all types of conditions. Nevertheless, reducing the system's dependency on the battery by using power from the ONT lines 19 to a greater extent helps to preserve the life of the battery and reduce the maintenance burdens for the network service provider.

Figure 2:
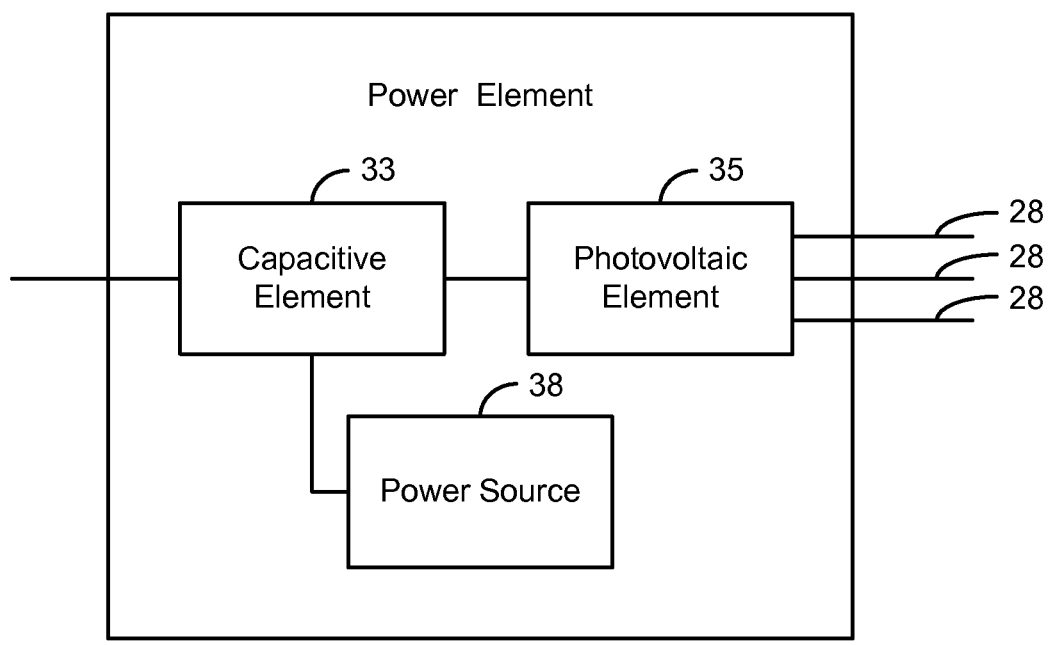
FIG. 2 is a block diagram depicting an exemplary power element, such as is depicted by FIG. 1.

FIG. 2 depicts an exemplary embodiment of the power element 27 of FIG. 1. In the exemplary embodiment shown by FIG. 2, the power element 27 comprises a capacitive element 33 and a photovoltaic element 35. The photovoltaic element 35 is coupled to the power splitters 29 (FIG. 1) via power connections 28. Through the power splitters 29 and connections 28, the photovoltaic element 35 receives a small amount of light from each ONT line 19 and converts such received light into electrical current. In this regard, each ONT 15 (FIG. 1) transmits optical signals via its respective ONT line 19, and such optical signals are split by the line's power splitter 29 such that a portion of the signals are received by the power element 27 and converted into electrical current by the photovoltaic element 35. In addition, optical signals from the OLT 12 may be similarly split by each power splitter 20. The photovoltaic element 35 sums the electrical current drawn from all of the ONT lines 19 into an aggregate current, hereafter referred to as a "power signal", that is provided to the capacitive element 33, which stores energy from the power signal. The control element 25 (FIG. 1) is coupled to the capacitive element 33 and draws power from such element 33 for operation, including changing the states of the switches 23 when appropriate.

In order to limit adverse effects to signal quality, each power splitter 29 is configured to split the optical signals received by it such that a small amount (e.g., less than about 10%) of the overall power of such signals is received by the power element 27. Siphoning such a small portion of the power from each line 19 should have a relatively insignificant effect on signal quality while providing a sufficient amount of power for powering the control element 25 and the switches 23, according to the techniques described herein. However, different amounts of power can be drawn from each ONT line 19 in other embodiments.

The capacitive element 33 is configured to receive electrical current from the photovoltaic element 35 and to provide a conditioned electrical power signal to the control element 25 and the switches 23 for operation. In this regard, power fluctuations are inherent when deriving power from optical signals communicated across the ONT lines 19. The capacitive element 33 smoothes the power fluctuations and stores excess electrical energy, if any, for later use in providing the conditioned power signal to the control element 25. Techniques for harnessing electrical current from fluctuating power sources to provide a conditioned power signal are generally well-known in the art. In one embodiment, the capacitive element 33 comprises a capacitor that is charged by current from the photovoltaic element 35. In addition, the element 33 also comprises a voltage regulator that regulates the voltage output by the capacitive element 33. Charge that is not required to provide the regulated voltage is stored in the capacitor. In other embodiments, other types of capacitive elements are possible, such as, for example, a battery being trickle-charged by the photovoltaic element 35.

In one embodiment, the power element 27 further comprises a power source 38 coupled to the capacitive element 33. The power source 38, such as, for example, a solar panel or battery, helps to ensure robustness such that any power fluctuation does not result in an interruption to the power signal. Thus, if an adequate amount of power is not provided from the photovoltaic element 35, the power source 38 provides additional power to the capacitive element 33 in order ensure that the control element 25 and the switches 23 have an adequate amount of power for operation. However, in other embodiments, the use of a power source 38 is not required, and the power supplied from the control element 25 and switches 23 may be derived exclusively from the optical signals communicated across the ONT lines 19.

Figure 3:
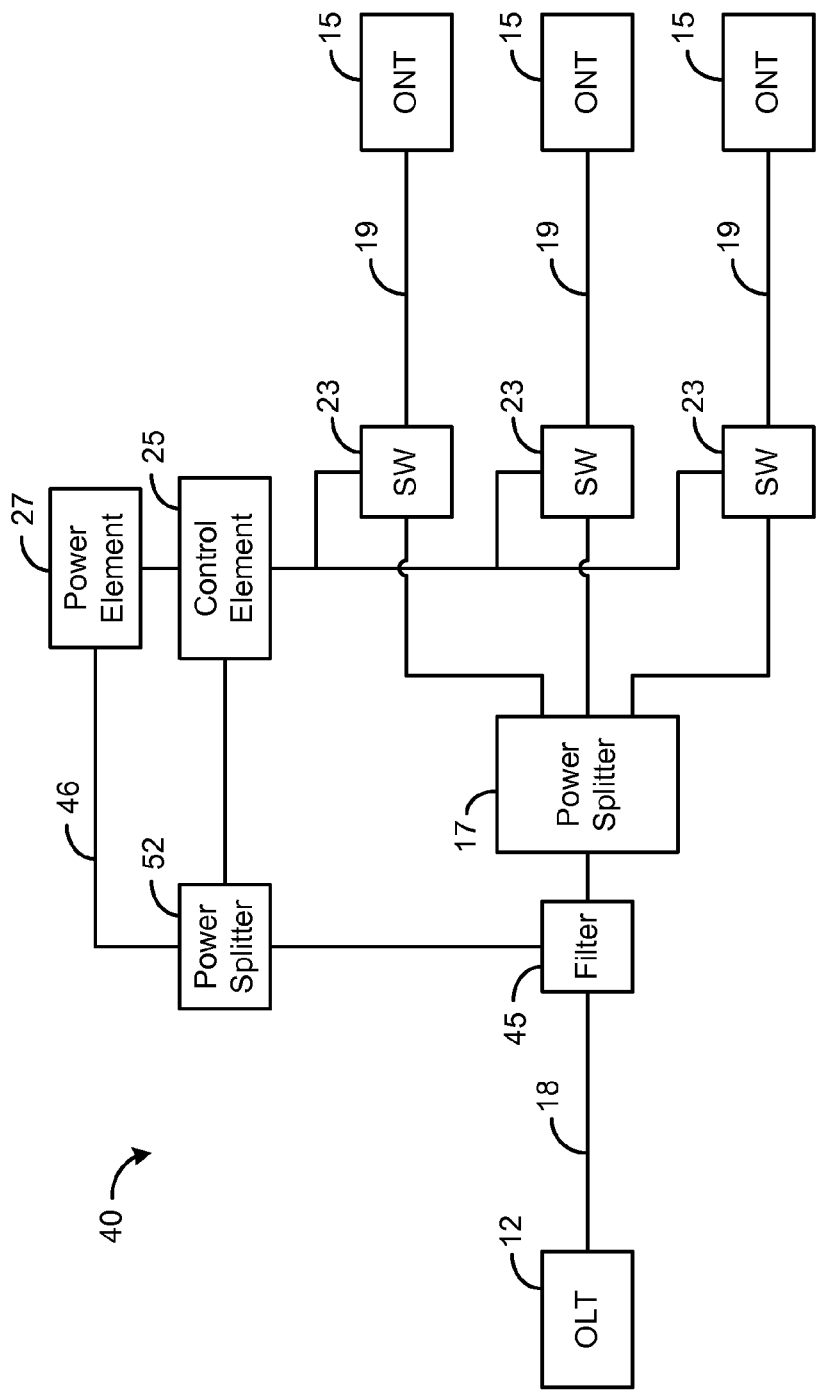
FIG. 3 is a block diagram illustrating another exemplary passive optical network in accordance with the present disclosure.

FIG. 3 depicts another exemplary embodiment of a PON 40. The PON 40 is configured and operates the same as the exemplary PON 10 depicted by FIG. 1 except as otherwise described herein. In FIG. 3, the power element 27 does not derive power from the optical signals propagating across the ONT lines 19, as described above for FIG. 1, but rather derives power from optical signals propagating across the OLT line 18. In this regard, the power element 27 is coupled to a filter 45 via a power connection 46, and the filter 45 is coupled to and receives optical signals from the OLT line 18. In this regard, the OLT 12 transmits an out-of-band optical signal along the OLT line 18, and the filter 45 separates such optical signal from the optical data signal also transmitted by the OLT 12 across the OLT line 18. Preferably, the out-of-band signal is transmitted at a relatively high power in a wavelength range different than the wavelength range of the data signal so that the filter 45 can separate the out-of-band signal from the data signal via conventional wavelength filtering techniques. Using the same techniques as described above for converting light into electrical power, the power element 27 converts the out-of-band optical signal into electrical current and provides an electrical power signal to the control element 25 and the switches 23.

As shown by FIG. 3, the path from the filter 45 to the power element 27 has a power splitter 52 for splitting a small amount of the power from the out-of-band signal to the control element 25 in order to provide a control channel to the control element 25. In such embodiment, the out-of-band signal is modulated with control information by the OLT 12, and the control element 25 demodulates the out-of-band signal to recover such control information, as is described above for the high-speed data stream in the embodiment depicted by FIG. 1. However, it is possible for the high-speed data stream, instead of the out-of-band control signal, to be modulated with control information similar to the embodiment depicted by FIG. 1 in which case a separate splitter 52 in the path between the filter 45 and the power element 27 would not be needed.

Note that, if desired, the embodiments set forth above with respect to FIGS. 1 and 3 may be combined such that the power element 27 receives light from the OLT line 18, as shown by FIG. 3, and the ONT lines 19, as shown by FIG. 2.

In one exemplary embodiment, assume that the PON 10 comprises the power element 27 coupled to a plurality of the ONT lines 19 via respective power connections 28, as shown by FIG. 1. Also assume that a switch 23 is coupled to each ONT line 19, and that the switches 23 comprise latching switches such that they draw current only when switching states.

The OLT 12 transmits optical data signals in one wavelength range to the ONTs 15 through the power splitter 17 via the communication line 18. The OLT 12 also receives optical signals in another wavelength range from each of the ONTs 15 during their respective allocated timeslots. The power element 27 receives a portion of the optical signals transmitted by each ONT 15 and/or the OLT 12 and converts such received light into electrical current, as shown by block 100 of FIG. 4. The power element 27 also provides an electrical current that is derived from the light received from all of the ONT lines 19. Excess energy that is not immediately used for the power signal is stored in the power element 27 for later use in order to smooth fluctuations in the current derived from the optical signals. In this regard, the photovoltaic element 35 sums the current derived from each ONT line 19 and transmits the combined current to the capacitive element 33. The capacitive element 33 stores electrical energy from the combined current and distributes the energy as a conditioned electrical power signal for powering the control element 25 and the switches 23.

Figure 4:
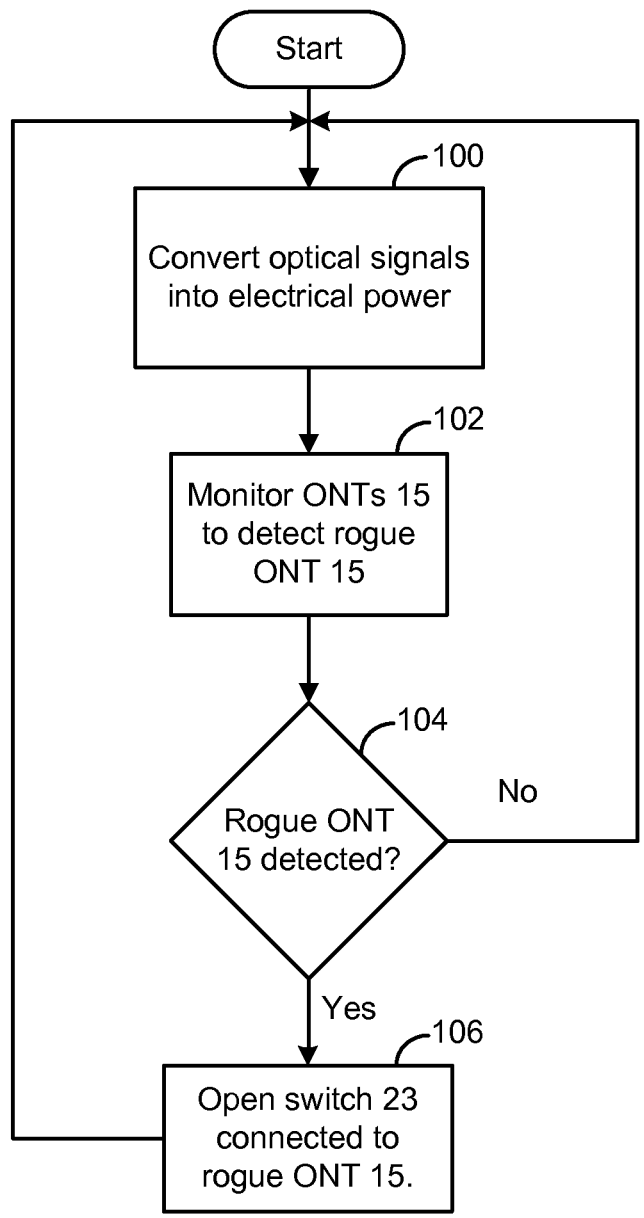
FIG. 4 is a flowchart illustrating an exemplary method for protecting an optical network from rogue optical network terminals.

During operation while data is being communicated across the PON 10, the OLT 12 monitors the optical signals received from the ONTs 15 to ensure that the data from the ONTs 15 is properly time-division multiplexed (e.g., there are no rogue ONTs babbling outside of their allocated timeslots), as shown by block 102 of FIG. 4. If none of the ONTs 15 are babbling outside of their allocated timeslots, the upstream communication is properly time-division multiplexed, and the OLT 12 continues to monitor the ONTs 15. Now assume that one of the ONTs 15 begins transmitting outside of its allocated timeslots (e.g., is a rogue ONT 15). The OLT 12 detects such occurrence in block 104 of FIG. 4. There are various techniques that can be used to sense when a rogue ONT 15 is babbling. In one embodiment, the OLT 12 detects a rogue ONT 15 when signal quality becomes significantly degraded (e.g., signal-to-noise ratio falls below a threshold or error rate exceeds a threshold) and the received power exceeds a threshold. In this regard, a babbling ONT 15 results in signal interference while at the same time increasing the overall power seen on the data channel since more than one ONT 15 is transmitting at the same time.

Once the OLT 12 detects a rogue ONT 15, the OLT 12 communicates with the control element 25 via a control channel to cause the control element 25 to open the switch 23 that is coupled to the rogue ONT 15, thereby optically isolating the rogue ONT 15 from the rest of the PON 10, as shown by block 106 of FIG. 4. There are various control algorithms to identify and open the switch 23 that corresponds to the rogue ONT 15. One exemplary algorithm will be described in more detail below, but it should be emphasized that other algorithms are possible in other embodiments.

In this regard, the OLT 12 initially instructs each ONT 15 to stop transmitting. At this point, only the rogue ONT 15 should be transmitting in the upstream direction. The OLT 12 then selects one of the ONTs 15 and instructs the control element 25 to open the switch 23 that is coupled to the selected ONT 15. In response, the control element 25 actuates such switch 23 thereby transitioning the switch 23 to the open state. Opening of such switch 23 optically isolates the selected ONT 15 from the PON 10. Thus, any transmission by such ONT 15 is effectively blocked by the open switch 23 and, thus, should not be received by the OLT 12.

After instructing the control element 25 to open the switch 23 coupled to the selected ONT 15, the OLT 12 waits a predefined amount of time while monitoring the upstream data channel for transmissions. If such transmissions continue, then the OLT 12 determines that the selected ONT 15 is not rogue. However, if the transmissions cease for at least a predefined time period after the switch 23 has been opened, then the OLT 12 determines that the selected ONT 15 is rogue. That is, the OLT 12 determines that the selected ONT 15 is rogue since opening the switch 23 coupled to such ONT 15 stopped the babbling that was interfering with data communication.

If the selected ONT 15 is not determined to be rogue, then the OLT 12 selects another ONT 15 and repeats the aforementioned process of opening the switch 23 coupled to the selected ONT 15 to see if babbling stops. Moreover, the OLT 12 continues testing each ONT 15 serially in such manner until the rogue ONT 15 is found. Once the OLT 12 identifies the rogue ONT 15, the OLT 12 transmits a control message to the control element 25 instructing such element 25 to close the switches 23 that are coupled to the ONTs 15 determined not to be rogue. In response to the instruction, the control element 25 transitions the switches 23 one at a time to the closed state except for the ONT 15 identified as being rogue. Thus, only the switch 23 coupled to the rogue ONT 15 remains open. At such point, communication across the PON 10 free of interference from the rogue ONT 15 may commence.

Now, therefore, the following is claimed:

1. An optical network, comprising:
a power splitter coupled to a first optical fiber;
a plurality of optical fibers coupled to the power splitter;
a plurality of optical network terminals (ONTs) respectively coupled to the plurality of optical fibers and configured to transmit a plurality of optical data signals across the plurality of optical fibers;
a plurality of switches, wherein each switch is coupled to a respective one of the plurality of optical fibers between the power splitter and a respective one of the ONTs;
an optical line terminal (OLT) coupled to the first optical fiber and configured to communicate with the ONTs via the first optical fiber, the power splitter, and the plurality of optical fibers, the OLT configured to detect rogue behavior from at least one of the ONTs, the OLT further configured to transmit control data based on a detection of the rogue behavior by the OLT;
a control element coupled to the switches, the control element configured to receive the control data from the OLT and to selectively control the switches based on the control data such that at least one of the switches optically isolates the at least one of the ONTs from the OLT in response to the detection of the rogue behavior from the at least one of the ONTs;
a plurality of power splitters, each of the plurality of power splitters coupled to a respective one of the plurality of optical fibers; and
a power element coupled to each of the plurality of power splitters and configured to receive the plurality of optical data signals from the plurality of power splitters, each of the received optical data signals from a respective one of the plurality of power splitters, the power element configured to convert the received plurality of optical data signals into an electrical power signal for powering the control element and the switches.

2. The optical network of claim 1, wherein the power element is coupled to the first optical fiber and is configured to receive an optical signal from the first optical fiber.

3. The optical network of claim 1, further comprising a filter coupled to the first optical fiber between the OLT and the power splitter, wherein the power element is coupled to the filter and is configured to receive an optical signal from the filter.

4. The optical network of claim 1, wherein the OLT is configured to transmit a downstream optical data signal across the first optical fiber and each of the plurality of optical fibers to the ONTs, and wherein the OLT is configured to modulate the downstream optical data signal with the control data.

5. The optical network of claim 1, wherein the control element based on the control data is configured to serially transition the switches to a new state for enabling the OLT to identify which of the ONTs is exhibiting the rogue behavior.

6. The optical network of claim 1, wherein the control element is configured to transition at least one of the switches to a new state based on the control data, and wherein the OLT is configured to identify which of the ONTs is exhibiting the rogue behavior based on the transition of the at least one switch to the new state.

7. The optical network of claim 6, wherein the OLT is configured to identify which of the ONTs is exhibiting the rogue behavior based on a change to the rogue behavior detected by the OLT in response to the transition of the at least one switch to the new state.

8. The optical network of claim 1, wherein the OLT is configured to modulate an optical signal with data, thereby forming a downstream optical data signal, and to transmit the downstream optical data signal across the first optical fiber to the ONTs, wherein the OLT is configured to transmit the control data across the first optical fiber at a data rate lower than a data rate of the downstream optical data signal.

9. The optical network of claim 8, wherein the OLT is configured to modulate the downstream optical data signal with the control data.

10. The optical network of claim 1, wherein the OLT is configured to modulate an optical signal with data, thereby forming a downstream optical data signal, wherein the OLT is configured to modulate the downstream optical data signal with the control data thereby affecting a frequency, amplitude, or phase of a portion of the downstream optical data signal carrying the data used to modulate the optical signal, and wherein the OLT is configured to transmit the modulated downstream optical data signal across the first optical fiber to the ONTs.

11. The optical network of claim 1, wherein the OLT is configured to modulate an optical signal with data, thereby forming a downstream optical data signal, wherein the OLT is configured to modulate the downstream optical data signal with the control data such that the control data is superimposed on the data used to modulate the optical signal, and wherein the OLT is configured to transmit the modulated downstream optical data signal across the first optical fiber to the ONTs.

12. The optical network of claim 1, wherein the power element has a capacitive element for storing energy from each of the plurality of power splitters.

13. The optical network of claim 12, wherein each of the switches is a latching switch.

14. An optical network, comprising:
a power splitter coupled to the first optical fiber;
a plurality of optical fibers coupled to the power splitter;
a plurality of optical network terminals (ONTs) respectively coupled to the plurality of optical fibers and configured to transmit a plurality of optical data signals across the plurality of optical fibers;
an optical line terminal (OLT) coupled to the first optical fiber and configured to communicate with the ONTs via the first optical fiber, the power splitter, and the plurality of optical fibers, the OLT configured to detect rogue behavior from at least one of the ONTs, the OLT further configured to transmit control data in response to a detection of the rogue behavior by the OLT;
means for selectively isolating a respective one of the ONTs from the OLT based on the control data received from the OLT, the selectively isolating means coupled to each of the plurality of optical fibers between the power splitter and a respective one of the ONTs;
a plurality of power splitters, each of the plurality of power splitters coupled to a respective one of the plurality of optical fibers; and
a power element coupled to each of the plurality of power splitters and configured to receive the plurality of optical data signals from the plurality of power splitters, the power element configured to convert the received optical data signals from the plurality of power splitters into an electrical power signal for powering the means for selectively isolating.

15. A method for use in an optical network, comprising:
transmitting a downstream optical data signal from an optical line terminal (OLT);
splitting the downstream optical data signal via a power splitter coupled to a plurality of optical fibers such that the downstream optical data signal propagates across a plurality of optical fibers to a plurality of optical network terminals (ONTs) coupled to the plurality of optical fibers;
detecting rogue behavior from one of the ONTs via the OLT;
transmitting control data from the OLT based on the detecting;
selectively controlling a plurality of switches based on the control data such that at least one of the ONTs is optically isolated from the OLT in response to the detecting, each of the plurality of switches coupled to a respective one of the plurality of optical fibers;
splitting, via a plurality of power splitters respectively coupled to the plurality of optical fibers, a plurality of upstream optical data signals transmitted by the plurality of ONTs;
receiving the plurality of upstream optical data signals from the plurality of power splitters;

converting the received upstream optical data signals into an electrical current to provide an electrical power signal; and
powering the switches with the electrical power signal.

16. The method of claim 15, further comprising modulating the downstream optical data signal with the control data.

17. The method of claim 15, further comprising amplitude modulating the downstream optical data signal with the control data.

18. The method of claim 15, further comprising:
transitioning at least one of the switches to a new state; and
identifying which of the ONTs is exhibiting the rogue behavior based on the transitioning.

19. The method of claim 18, further comprising determining a change to the rogue behavior in response to the transitioning, wherein the identifying is based on the determining.

20. The method of claim 15, further comprising:
modulating an optical signal with data, thereby forming the downstream optical data signal, wherein the transmitting the control data from the OLT comprises transmitting the control data from the OLT at a data rate lower than a data rate of the downstream optical data signal.

21. The method of claim 20, further comprising modulating the downstream optical data signal with the control data.

22. The method of claim 15, further comprising:
modulating an optical signal with data, thereby forming the downstream optical data signal; and
modulating the downstream optical data signal with the control data thereby affecting a frequency, amplitude, or phase of a portion of the downstream optical data signal carrying the data used to modulate the optical signal.

23. The method of claim 15, further comprising:
modulating an optical signal with data, thereby forming the downstream optical data signal; and
modulating the downstream optical data signal with the control data such that the control data is superimposed on the data used to modulate the optical signal.

24. An optical network, comprising:
a power splitter coupled to a first optical fiber;
a plurality of optical fibers coupled to the power splitter;
a plurality of optical network terminals (ONTs) respectively coupled to the plurality of optical fibers and configured to transmit a plurality of upstream optical data signals across the plurality of optical fibers;
a plurality of switches, wherein each switch is coupled to a respective one of the plurality of optical fibers between the power splitter and a respective one of the ONTs;
an optical line terminal (OLT) coupled to the first optical fiber and configured to communicate with the ONTs via the first optical fiber, the power splitter, and the plurality of optical fibers, the OLT configured to detect rogue behavior from at least one of the ONTs, the OLT further configured to transmit control data based on a detection of the rogue behavior by the OLT;
a control element coupled to the switches, the control element configured to receive the control data from the OLT and to selectively control the switches based on the control data such that at least one of the switches optically isolates the at least one of the ONTs from the OLT in response to the detection of the rogue behavior from the at least one of the ONTs, wherein the OLT is configured to transmit a downstream optical data signal across the first optical fiber and each of the plurality of optical fibers to the ONTs, and wherein the OLT is configured to modulate the downstream optical data signal with the control data;

a plurality of power splitters, each of the plurality of power splitters coupled to a respective one of the plurality of optical fibers; and a power element coupled to each of the plurality of power splitters and configured to receive the plurality of upstream optical data signals from the plurality of power splitters, the power element further configured to convert the received plurality of upstream optical data signals into an electrical current for powering the control element and the switches.

25. The optical network of claim 24, wherein each ONT is configured to receive and process the downstream optical data signal received from the OLT.

* * * * *